(12) United States Patent
Gotoh

(10) Patent No.: US 8,203,773 B2
(45) Date of Patent: Jun. 19, 2012

(54) IMAGE PROCESSING METHOD, IMAGE PROCESSING APPARATUS, IMAGE FORMING APPARATUS, AND RECORDING MEDIUM FOR CHROMATIC CONTENT DETERMINATION

(75) Inventor: Makio Gotoh, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 771 days.

(21) Appl. No.: 12/182,887

(22) Filed: Jul. 30, 2008

(65) Prior Publication Data

US 2009/0034005 A1  Feb. 5, 2009

(30) Foreign Application Priority Data

Jul. 31, 2007  (JP) ................. 2007-199929

(51) Int. Cl.
  *G06K 15/00* (2006.01)
  *H04N 1/46* (2006.01)
(52) U.S. Cl. ........................ 358/538; 358/2.1
(58) Field of Classification Search .......... None
  See application file for complete search history.

(56) References Cited

U.S. PATENT DOCUMENTS

| 6,118,895 | A | 9/2000 | Hirota et al. | |
| 6,426,809 | B1 * | 7/2002 | Hayashi et al. | 358/529 |
| 6,473,202 | B1 * | 10/2002 | Kanata et al. | 358/2.1 |
| 6,631,210 | B1 * | 10/2003 | Mutoh et al. | 382/176 |
| 7,339,703 | B2 * | 3/2008 | Kagawa | 358/1.9 |
| 2005/0271270 | A1 | 12/2005 | Hsieh et al. | |
| 2009/0021753 | A1 * | 1/2009 | Ferman et al. | 358/1.9 |

FOREIGN PATENT DOCUMENTS

| CN | 1708096 A | 12/2005 |
| JP | 8-251402 A | 9/1996 |
| JP | 2004-274397 A | 9/2004 |
| JP | 2008-035478 A | 2/2008 |

* cited by examiner

*Primary Examiner* — Twyler Haskins
*Assistant Examiner* — Barbara Reinier
(74) *Attorney, Agent, or Firm* — Birch, Stewart, Kolasch & Birch, LLP

(57) ABSTRACT

An image processing apparatus includes a counting section for counting pixels belonging to a chromatic text component and chromatic pixels belonging to a component other than the text component among pixels composing image data obtained by reading a document, a comparison section for comparing the counted numbers with respective predetermined values, a determination section for determining that the document contains a chromatic color when either one of the number of the pixels belonging to the text component and the number of the chromatic pixels belonging to the component other than the chromatic text component is not less than the corresponding predetermined value, and an image processing section for performing a process with respect to the image data in accordance with a determination result by the determination section.

10 Claims, 14 Drawing Sheets

Th1 : PAGE BACKGROUND / PHOTOGRAPHIC - PICTURE DETERMINATION THRESHOLD VALUE
Th2 : MAXIMUM DENSITY DIFFERENCE THRESHOLD VALUE
Th3 : TOTAL DENSITY BUSYNESS THRESHOLD VALUE
L1 : MAXIMUM DENSITY DIFFERENCE = TOTAL DENSITY BUSYNESS
L2 : MAXIMUM DENSITY DIFFERENCE × TEXT / HALFTONE DETERMINATION THRESHOLD VALUE

PAGE BACKGROUND

MAXIMUM DENSITY DIFFERENCE

PHOTOGRAPHIC - PICTURE

MAXIMUM DENSITY DIFFERENCE

HALFTONE

MAXIMUM DENSITY DIFFERENCE

TEXT

MAXIMUM DENSITY DIFFERENCE

Th1 : PAGE BACKGROUND / PHOTOGRAPHIC - PICTURE
DETERMINATION THRESHOLD VALUE

Th2 : MAXIMUM DENSITY DIFFERENCE THRESHOLD VALUE

Th3 : TOTAL DENSITY BUSYNESS THRESHOLD VALUE

L1 : MAXIMUM DENSITY DIFFERENCE =
TOTAL DENSITY BUSYNESS

L2 : MAXIMUM DENSITY DIFFERENCE ×
TEXT / HALFTONE DETERMINATION THRESHOLD VALUE

IMAGE PROCESSING METHOD, IMAGE PROCESSING APPARATUS, IMAGE FORMING APPARATUS, AND RECORDING MEDIUM FOR CHROMATIC CONTENT DETERMINATION

CROSS-REFERENCE TO RELATED APPLICATIONS

This Nonprovisional application claims priority under 35 U.S.C. §119(a) on Patent Application No. 2007-199929 filed in Japan on Jul. 31, 2007, the entire contents of which are hereby incorporated by reference.

BACKGROUND

1. Technical Field

The present application relates to an image processing method, an image processing apparatus, an image forming apparatus, an image reading apparatus, and a recording medium which allow an improvement in the result of ACS determination.

2. Description of the Related Art

As image forming apparatuses such as electronic copiers, not only a conventional analog type, but also a digital type have been prevalent. With the advancement of a digital image processing technology, a full-color digital copier which reproduces a high-quality color image has been available as a commercial product. In general, a full-color digital copier performs color reproduction using a plurality of toners, and also has a monochrome mode using only a black toner. Copying in the monochrome mode uses only the black toner, and is therefore lower in cost and shorter in copying time than color copying which superimposes a plurality of toner images in succession.

In consideration of this, an ACS (Auto Color Selection) function has been actually used which determines whether a document is a color document or a monochrome document, and sets a copy mode in accordance with the document (see, e.g., Japanese Patent Laid-Open No. 8-251402). This function is particularly useful when a large number of documents are copied using an ADF (Automatic Document Feeder). A user need not discriminate a color document from a monochrome document and, by merely setting the plurality of documents to the ADF and pushing a start key, color copying is performed for a color document, while monochrome copying is performed for a monochrome document.

For example, in an image processing apparatus described in Japanese Patent Laid-Open No. 8-251402, a lightness histogram of a document and a histogram of achromatic dots in the document are generated, and a chromatic histogram of the document is calculated from the difference between these histograms. Next, it is determined whether the document is a color document or a black-and-white document according to the ratio between the number of chromatic pixels and the number of achromatic pixels. The histograms are analyzed based on the result of the determination so that the document is classified into any of five types of documents which are a black-and-white picture document, a black-and-white standard document, a full-color picture document, a color standard document with a white page background, and a color standard document with a color page background. Then, a proper page background correction, a black text discrimination process, a gray scale reproduction process, and the like are performed in accordance with the document type.

However, the discrimination between the chromatic pixels and the achromatic pixels is made irrespective of the classification of each pixel (to which one of a plurality of components including a text component and a halftone component the pixel belongs), and the determination of the color document or the monochrome document is made using the result of the discrimination. Accordingly, the accuracy of discrimination is low, and therefore the quality of an image is low. For example, there are cases where a document containing a color text with low chroma is determined to be a monochrome image document, and where a document composed only of composite gray is determined to be a color image document.

As a method for solving such a problem, the applicant of the present application has proposed a method which changes a criterion for ACS determination based on the result of discriminating pixels in Japanese Patent Application No. 2007-120055.

However, in this case, when noise is present in the vicinity of a black text or there are density variations, the black text is determined to be a color text so that a monochrome (black-and-white) document is erroneously determined to be a color document. In the case with a picture (halftone picture) printed in a spot color (custom color) such as brown, the problem occurs that an intrinsically color document is erroneously determined to be a monochrome document.

SUMMARY

The present application has been achieved in view of the foregoing circumstances, and an object thereof is to provide an image processing method, an image processing apparatus, an image forming apparatus, an image reading apparatus, and a recording medium which allow an improvement in the accuracy of ACS determination by determining that a read document contains a chromatic color when either one of the number of pixels belonging to a chromatic text component or the number of chromatic pixels belonging to a component other than the chromatic text component is not less than a predetermined value.

An image processing method according to the present application is an image processing method which determines whether or not a document contains a chromatic color based on image data obtained by reading the document, and performs a process in accordance with a result of the determination with respect to the image data, the image processing method comprising the steps of: counting pixels belonging to a chromatic text component and chromatic pixels belonging to a component other than the chromatic text component among pixels composing image data obtained by reading a document, comparing the counted number of the pixels belonging to the chromatic text component and the counted number of the chromatic pixels belonging to the component other than the text component with respective predetermined values; determining that the document contains a chromatic color when either one of the number of the pixels belonging to the chromatic text component and the number of the chromatic pixels belonging to the component other than the chromatic text component is not less than the corresponding predetermined value and performing a process with respect to the image data in accordance with the determination result.

In the image processing method according to the present application, the chromatic pixels belonging to the component other than the chromatic text component include at least one of a pixel belonging to a chromatic halftone component, a pixel belonging to a chromatic page background component, and a pixel belonging to a chromatic photographic-picture component.

An image processing apparatus according to the present application is an image processing apparatus which determines whether or not a document contains a chromatic color based on image data obtained by reading the document, and performs a process in accordance with a result of the determination with respect to the image data, the image processing apparatus comprising: a counting section for counting pixels belonging to a chromatic text component and chromatic pixels belonging to a component other than the chromatic text component among pixels composing image data obtained by reading a document, a comparison section for comparing the counted number of the pixels belonging to the chromatic text component and the counted number of the chromatic pixels belonging to the component other than the chromatic text component with respective predetermined values, a determination section for determining that the document contains a chromatic color when either one of the number of the pixels belonging to the text component and the number of the chromatic pixels belonging to the component other than the chromatic text component is not less than the corresponding predetermined value, and an image processing section for performing a process with respect to the image data in accordance with a determination result by the determination section.

In the image processing apparatus according to the present application, the chromatic pixels belonging to the component other than the chromatic text component include at least one of a pixel belonging to a chromatic halftone component, a pixel belonging to a chromatic page background component, and a pixel belonging to a chromatic photographic-picture component.

An image forming apparatus according to the present application comprises: the image processing apparatus described above and an image forming section for forming an image on a sheet based on image data subjected to a process performed by the image processing apparatus.

An image reading apparatus according to the present application comprises: an image input means for reading a document and the image processing apparatus described above, wherein the image processing apparatus performs image processing with respect to the document read by the image input means to provide output image data.

A recording medium according to the present application stores thereon the computer program for causing a computer to determine whether or not a document contains a chromatic color based on image data obtained by reading the document, and perform a process in accordance with a result of the determination with respect to the image data, the computer program comprising the steps of: causing a computer to count pixels belonging to a chromatic text component and chromatic pixels belonging to a component other than the chromatic text component among pixels composing image data obtained by reading a document, causing the computer to compare the counted number of the pixels belonging to the chromatic text component and the counted number of the chromatic pixels belonging to the component other than the text component with respective predetermined values, causing the computer to determine that the document contains a chromatic color when either one of the number of the pixels belonging to the chromatic text component and the number of the chromatic pixels belonging to the component other than the chromatic text component is not less than the corresponding predetermined value and causing the computer to perform a process with respect to the image data in accordance with the determination result.

In the present application, pixels belonging to the chromatic text component and pixels belonging to a color halftone which are the chromatic pixels in a component other than the text component are counted, and thresholds are set individually for the respective count values. Accordingly, even in a text document, a picture document, or a document containing both a text and a picture, the color document/monochrome document determination can be made with high accuracy. In particular, when noise is present in the vicinity of a black text or there are density variations, the erroneous determination of the black text to be a color text, and the erroneous determination of a monochrome (black-and-white) document to be a color document can be prevented. Additionally, in the case with a picture (halftone picture) printed in a specific color such as brown, the erroneous determination of an intrinsically color document to be a monochrome document can be prevented.

In the present application, the chromatic pixels belonging to the component other than the text component may appropriately include at least one of a pixel belonging to a chromatic halftone component, a pixel belonging to a chromatic page background component, and a pixel belonging to a chromatic photographic-picture component.

In the present application, even a document having a color text, a color printed-picture, and a color page background is reliably determined to be a color document.

In the present application, even a document including a color text, a color printed-picture, and a color photographic-picture is reliably determined to be a color document.

In the present application, even a document including a color text, a color printed-picture, a color page background, and a color photographic-picture is reliably determined to be a color document.

In the present application, even a document including a color text and a color page background, a document including a color text and a color photographic-picture, a document including a color text, a color page background, and a color photographic-picture, and a document including a color page background and a color photographic-picture are each reliably determined to be a color document.

In the present application, since the accuracy of determining whether a document is a color document or a monochrome document is improved, a high-quality image can be outputted.

In the present application, a document is read and determined to be a color document or a monochrome document with high accuracy, and a high-quality image data can be outputted.

In the present application, the image processing apparatus described above can be implemented by a process with a computer. This prevents the erroneous determination of a monochrome (black-and-white) document to be a color document, while conversely preventing the erroneous determination of a color document to be a monochrome document.

In the present application, the image processing apparatus described above is implemented by the computer program read from the recording medium.

In the present application, a threshold is set individually for each of the count values of pixels belonging to a color text and pixels belonging to a color halftone. Accordingly, even in a text document, a picture document, or in a document containing both a text and a picture, the color document/monochrome document determination can be made with high accuracy. In particular, when noise is present in the vicinity of a black text or there are density variations, the erroneous determination of the black text to be a color text, and the erroneous determination of a monochrome (black-and-white) document to be a color document can be prevented. Additionally, in the case with a picture (halftone picture) printed in a specific color such as brown, the erroneous determination of an intrinsically color document to be a monochrome document can be prevented.

In the present application, even a document having a color text, a color printed-picture, and a color page background is reliably determined to be a color document. As a result, the accuracy of the determination can be increased.

In the present application, even a document having a color text, a color printed-picture, and a color photographic-picture is reliably determined to be a color document. As a result, the accuracy of the determination can be increased.

In the present application, even a document having a color text, a color printed-picture, a color page background, and a color photographic-picture is reliably determined to be a color document. As a result, the accuracy of the determination can be increased.

In the present application, even a document including a color text and a color page background, a document including a color text and a color photographic-picture, a document including a color text, a color page background, and a color photographic-picture, and a document including a color page background and a color photographic-picture are each reliably determined to be a color document. As a result, the accuracy of the determination can be increased.

In the present application, since the accuracy of determining whether a document is a color document or a monochrome document is improved, a high-quality image can be outputted.

In the present application, a document is read and determined to be a color document or a monochrome document with high accuracy, and a high-quality image can be outputted.

In the present application, the image processing apparatus described above can be implemented by a process with a computer. This prevents the erroneous determination of a monochrome (black-and-white) document to be a color document, while preventing the erroneous determination of a color document to be a monochrome document.

In the present application, the image processing apparatus described above is implemented by the computer program read from the recording medium.

The above and further objects and features of the invention will more fully be apparent from the following detailed description with accompanying drawings.

DETAILED DESCRIPTION

The present application will be specifically described hereinbelow with reference to the drawings showing embodiments thereof.

Embodiment 1

Figure 1:
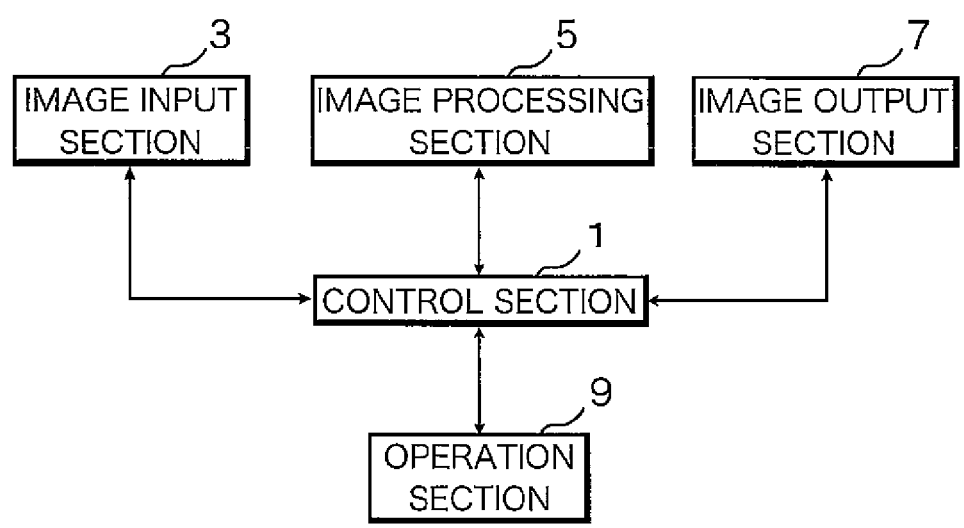
FIG. 1 is a block diagram illustrating an internal structure of an image processing apparatus according to the present application.

FIG. 1 is a block diagram illustrating an internal structure of an image processing apparatus according to the present application. An image processing apparatus according to the present application comprises a control section 1, an image input section 3, an image processing section 5, an image output section 7, and an operation section 9. The control section 1 comprises a ROM storing therein a control program for controlling the individual hardware sections mentioned above, a CPU for executing the control program, a RAM for storing various data generated during the execution of the control program, and the like.

The image input section 3 is means for optically reading an image of a document, and comprises a light source for irradiating the document to be read with light, an image sensor such as a CCD (Charge Coupled Device), and the like. In the image input section 3, light reflected from the document set at a predetermined read position is converged to form an image in the image sensor, and RGB (R: Red, G: Green, and B: Blue) analog electric signals are outputted. The analog electric signals outputted by the image input section 3 are inputted to the image processing section 5.

The image processing section 5 converts the analog electric signals outputted from the image input section 3 to digital electric signals, and then performs image processing in accordance with the document type to generate image signals to be outputted. The generated image signals are outputted to the image output section 7. In the present embodiment, CMYK signals (C: cyan, M: Magenta, Y: Yellow, and K: Black) are generated as the image signals to be outputted. An internal structure of the image processing section 5, the operation thereof, and the like will be described later in detail.

The image output section 7 is means for performing the formation of an image on a sheet such as paper, an OHP film, or the like based on the image signals outputted by the image processing section 5. Therefore, the image output section 7 comprises a charger for charging a photoreceptor to a predetermined electric potential, a laser scanning device for emitting laser light in accordance with image data received from the outside to generate an electrostatic latent image on the photoreceptor, a developing device for supplying a toner to the electrostatic latent image formed on the surface of the photoreceptor so as to develop the latent image into a visible image, a transfer device (not shown) for transferring the toner image formed on the surface of the photoreceptor onto paper, and the like. The image output section 7 forms an image desired by a user on paper in accordance with an electrophotographic method. Besides forming an image by the electrophotographic method using the laser scanning device, an image may also be formed by an inkjet method, a thermal transfer method, a sublimation method, or the like.

The operation section 9 comprises various switches and buttons to receive an instruction, an select operation, and the like from the user.

Figure 2:
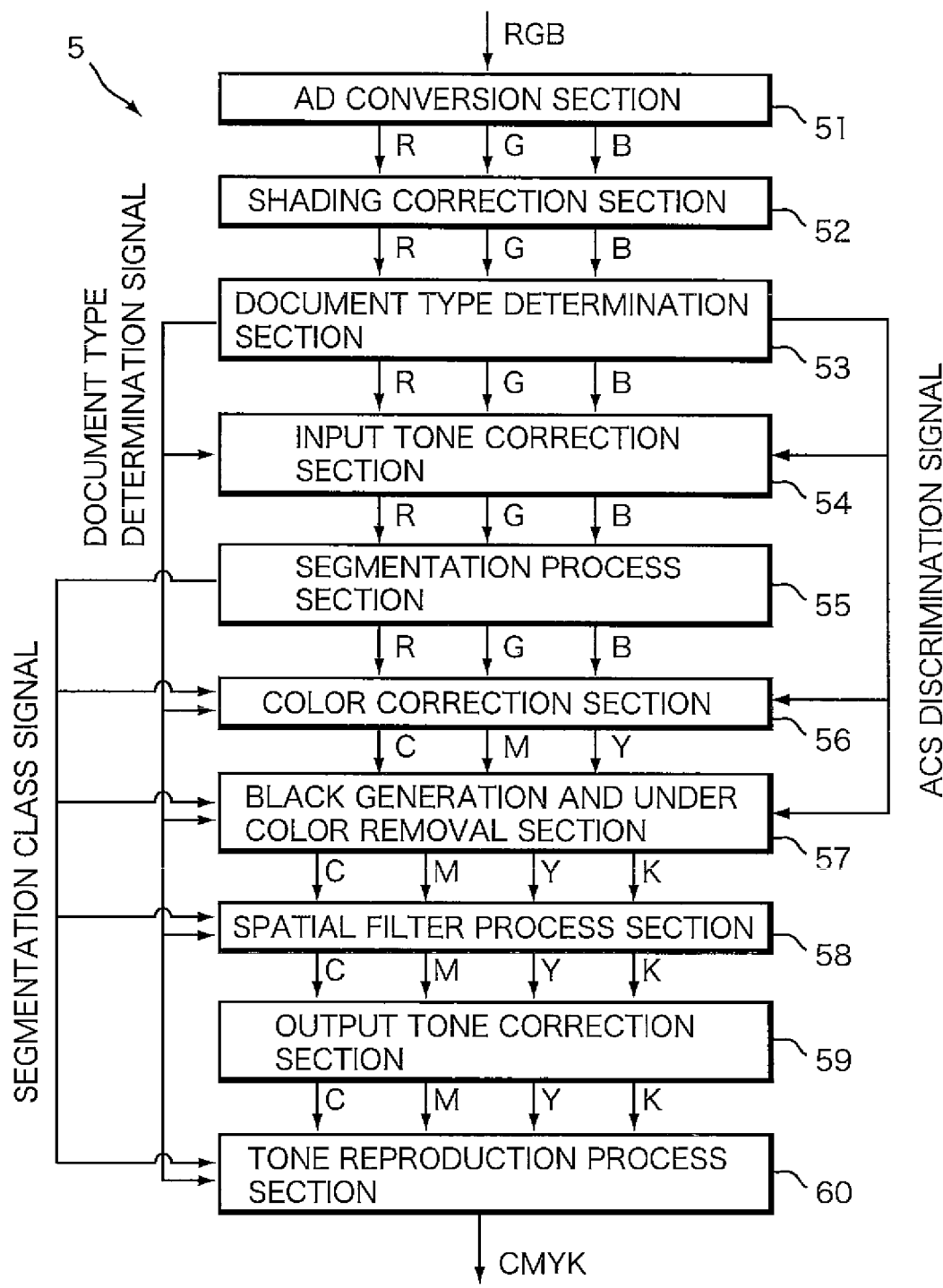
FIG. 2 is a block diagram illustrating a structure of an image processing section.

FIG. 2 is a block diagram illustrating a structure of the image processing section 5. The image processing section 5 comprises an AD conversion section 51, a shading correction section 52, a document type determination section 53, an input tone correction section 54, a segmentation process section 55, a color correction section 56, a black generation and under color removal section 57, a spatial filter process section 58, an output tone correction section 59, and a tone reproduction process section 60.

The AD conversion section 51 converts RGB analog signals inputted from the image input section 3 to digital signals. The shading correction section 52 performs a process for removing various distortions occurring in an illuminating system, image focusing system, and image sensing system of the image input section 3 with respect to the RGB digital signals outputted from the AD conversion section 51. The shading correction section 52 also performs adjustment of the color balance.

The document type determination section 53 converts the RGB (RGB reflectance signal) from which various distortions are removed in the shading correction section 52, and to which the adjustment of the color balance is performed also in the shading correction section 52 to a signal such as a density (pixel value) signal which is easily processed by an image processing system adopted in a color image processing apparatus, and performs the determination of a document type as well as the determination of a color document (document containing a chromatic color) or a monochrome document. A document type determination signal outputted as the determination result by the document type determination section 53 is inputted to the input tone correction section 54, the color correction section 56, the black generation and under color removal section 57, the spatial filter process section 58, and the tone reproduction process section 60 each in subsequent stages, while an ACS discrimination signal is inputted to the input tone correction section 54, the color correction section 56, and the black generation and under color removal section 57. Respective determination methods thereof will be described later in detail.

The input tone correction section 54 performs an image quality adjustment process such as the removal of a page background density, contrast, or the like. The segmentation process section 55 performs a process for classifying each of pixels within an input image of the RGB signals into any of a text component, a halftone component, and other (page background and photographic-picture) components which do not belong to a text component and a halftone component. The segmentation process section 55 outputs, based on the result of the segmentation, a segmentation class signal for indicating to which segment (component) the pixel belong to the color correction section 56, the black generation and under color removal section 57, the spatial filter process section 58, and the tone reproduction process section 60 each in subsequent stages, and also outputs input signals outputted from the input tone correction section 54 as they are to the color correction section 56 in the subsequent stage.

The color correction section 56 performs a process for removing color impurity based on the spectral characteristic of CMY color materials containing useless absorption components to faithfully reproduce a color. The black generation and under color removal section 57 performs a black generation process for generating a black (K) signal from three color signals of CMY after the color correction, and a process for generating new CMY signals by subtracting the K signal obtained by the black generation process from the original CMY signals. With these processes, the three color signals of CMY are converted to four color signals of CMYK.

As an example of the black generation process, there has been known a method (typical method) for performing black generation by a skeleton black method. In this method, when it is assumed that the input-output characteristics of a skeleton curve is y=f(x), input data are C, M, and Y, output data are C', M', Y', and K', and UCR rate (UCR: Under Color Removal) is $\alpha$ ($0<\alpha<1$), the black generation and under color removal process is given by the following expression:

$$K'=f\{\min(C,M,Y)\}$$

$$C'=C-\alpha K'$$

$$M'=M-\alpha K'$$

$$Y'=Y-\alpha K'$$

The spatial filter process section 58 performs, based on the segmentation class signal, a spatial filtering process with respect to the image data of the CMYK signals inputted from the black generation and under color removal section 57 to prevent the blur and the granular degradation of an output image by correcting the characteristic of spatial frequency.

For example, for a component classified as the text component by the segmentation process section 55, in order to improve the reproducibility of especially a black text or a color text, a high frequency component is emphasized by a edge enhancement process in the spatial filtering process performed by the spatial filter process section 58. At the same time, in the tone reproduction process section 60, a binarizing or multi-level dithering process on a high-resolution screen suitable for the reproduction of high frequencies is selected. For a component classified as the halftone component, a low-pass filter processing for removing input halftone components is performed in the spatial filter process section 58. Then, in the output tone correction section 59, an output tone correction process for converting a signal such as the density signal to a halftone area ratio, which is a characteristic value of a color image output apparatus, is performed. Thereafter, in the tone reproduction process section 60, a tone reproduction process for dividing the image into pixels so as to be able to reproduce each of tones in the end is performed. In addition, for a component classified as other components by the segmentation process section 55, the binarizing or multi-level dithering process is performed on a screen suitable for tone reproduction.

Figure 3A:
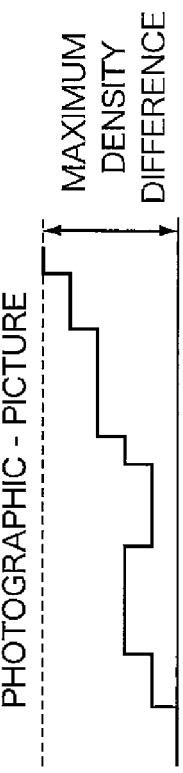
FIGS. 3A to 3D are schematic diagrams showing examples of respective pixel density distributions in a page background component, a photographic-picture component, the halftone component, and the text component.

A description will be given hereinbelow to a method for the determination executed by the document type determination section 53. FIGS. 3A to 3D are schematic diagrams showing examples of respective pixel density distributions in a page background component, a photographic-picture (continuous tone) component, the halftone component, and the text component. FIG. 4 is a schematic diagram showing a distribution based on a maximum density difference and a total density busyness in each of the components. FIG. 3A shows the density distribution in the page background component. In each of FIGS. 3A to 3D, the horizontal axis indicates the pixel, while the vertical axis indicates the density. In the density distribution in the page background component, a change in the density is normally small. Accordingly, both of the maximum density difference and the total density busyness are extremely small so that the distribution shown in FIG. 4 is given. Therefore, for a pixel determined to belong to a page background/photographic-picture component, when the maximum density difference is smaller than a page background/photographic-picture determination threshold (Th1), the pixel can be determined to be a page background pixel.

Figure 3B:
Figure 4:
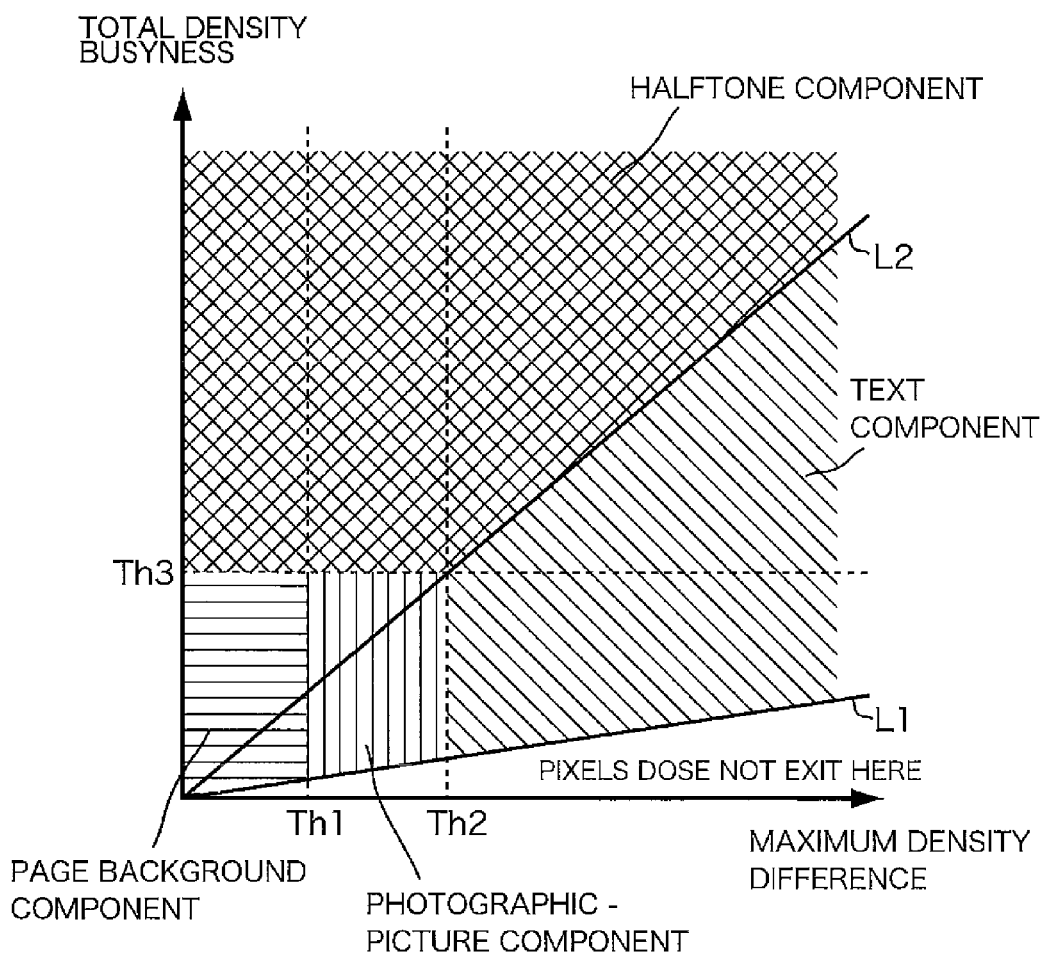
FIG. 4 is a schematic diagram showing a distribution based on a maximum density difference and a total density busyness in each of the components.

The density distribution in the photographic-picture component is normally smooth in the density change, as shown in FIG. 3B. Both of the maximum density difference and the total density busyness are small but slightly larger than those in the page background component so that the distribution shown in FIG. 4 is given. Accordingly, for a pixel determined to belong to the page background/photographic-picture component, when the maximum density difference is larger than the page background/photographic-picture determination threshold (Th1), the pixel can be determined to belong to the photographic-picture component. In the present application, a continuous tone component is described as the photographic-picture component. Images composed of the continuous tone component include a photographic-picture, a picture printed by a thermal transfer method, a picture printed on a glossy paper with high resolution by an inkjet method.

Figure 3C:
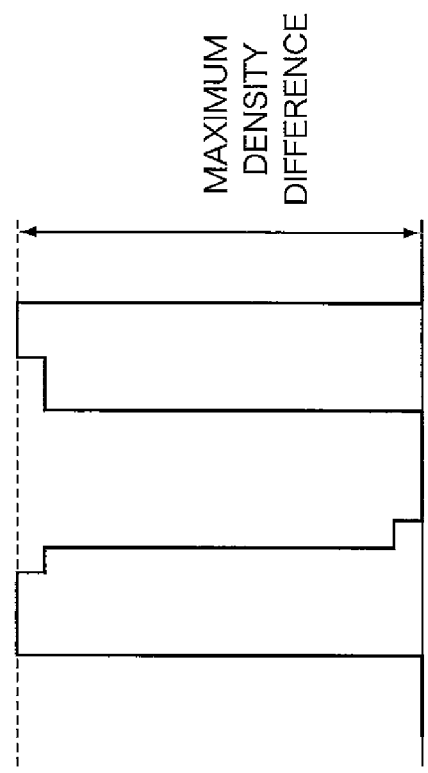

In the density distribution in the halftone component, as shown in FIG. 3C, the maximum density difference varies depending on a halftone, and the number of density changes occurs as many as the number of halftones. Accordingly, the ratio of the total density busyness to the maximum density difference is large so that the distribution shown in FIG. 4 is given. Accordingly, for a pixel determined to belong to a text/halftone component, when the total density busyness is larger than a product of the maximum density difference and a text/halftone determination threshold (L2), the pixel can be determined to be a halftone pixel.

Figure 3D:
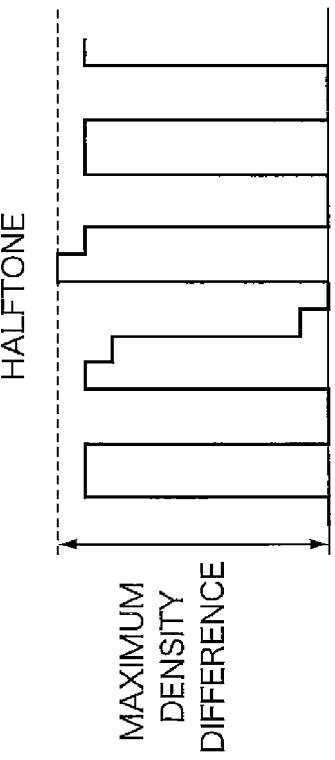

In the density distribution in the text component, the maximum density difference is large and the total density busyness is accordingly large, as shown in FIG. 3D. However, the density change is smaller than that in the halftone component and therefore the total density busyness is smaller than that in the halftone component. In particular, the ratio of the total density busyness to the maximum density difference is small so that the distribution shown in FIG. 4 is given. Accordingly, for a pixel determined to belong to the text/halftone component, when the total density busyness is smaller than the product of the maximum density difference and the text/halftone determination threshold, the pixel can be determined to be a text pixel.

Figure 5:
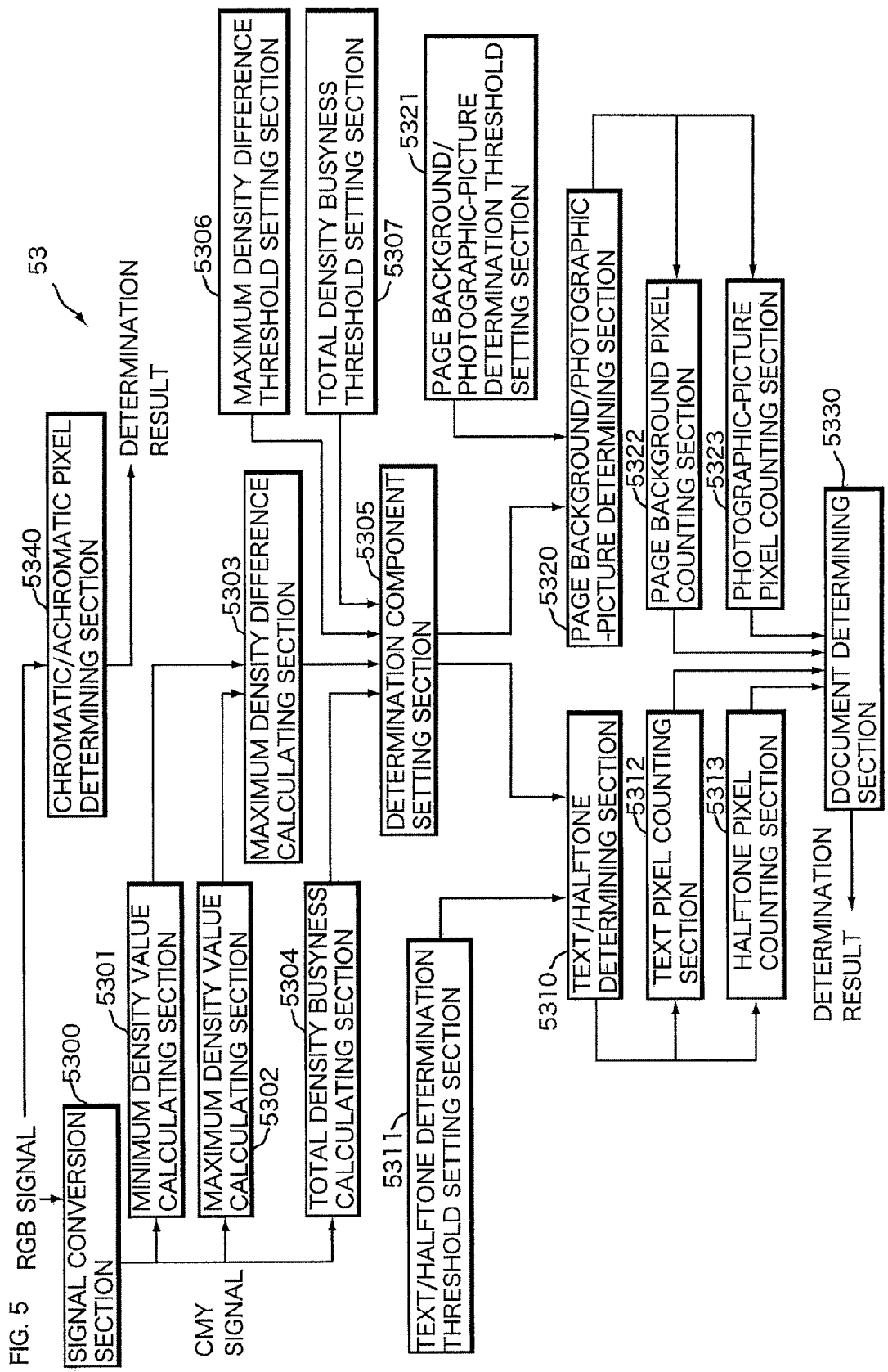
FIG. 5 is a block diagram illustrating a structure of a document type determination section.

Next, a description will be given to a process in the document type determination section 53. FIG. 5 is a block diagram illustrating a structure of the document type determination section 53. The document type determination section 53 comprises, a chromatic/achromatic pixel determining section 5340, a signal conversion section 5300, a minimum density value calculating section 5301, a maximum density value calculating section 5302, a maximum density difference calculating section 5303, a total density busyness calculating section 5304, a determination component setting section 5305, a maximum density difference threshold setting section 5306, a total density busyness threshold setting section 5307, a text/halftone determining section 5310, a text/halftone determination threshold setting section 5311, a text pixel counting section 5312, a halftone pixel counting section 5313, a page background/photographic-picture determining section 5320, a page background/photographic-picture determination threshold setting section 5321, a page background pixel counting section 5322, a photographic-picture pixel counting section 5323, and a document determining section 5330.

The chromatic/achromatic pixel determining section 5340 determines whether a target pixel is a chromatic pixel or an achromatic pixel, and provides notification of the determination result to the text pixel counting section 5312, the halftone pixel counting section 5313, the page background pixel counting section 5322, and the photographic-picture pixel counting section 5323.

The signal conversion section 5300 coverts RGB signals outputted from the shading correction section 52 to density signals of CMY, and outputs the converted signals to the minimum density value calculating section 5301, the maximum density value calculating section 5302, and the total density busyness calculating section 5304. The minimum density value calculating section 5301 calculates a minimum density value based on CMY signals inputted thereto, and the maximum density value calculating section 5302 calculates a maximum density value based on CMY signals inputted thereto. The maximum density difference calculating section 5303 calculates a maximum density difference using the minimum and maximum density values calculated by the minimum and maximum density value calculating sections 5301 and 5302.

The total density busyness calculating section 5304 calculates the sum of absolute values of the density differences between adjacent pixels. The determination component setting section 5305 classifies the page background/photographic-picture component and the text/halftone component, based on the maximum density difference calculated in the maximum density difference calculating section 5303, a threshold for the maximum density difference set in the maximum density difference threshold setting section 5306, the total density busyness calculated in the total density busyness calculating section 5304, and a threshold for the total density busyness set in the total density busyness threshold setting section 5307.

The text/halftone determining section 5310 determines whether pixels in a component classified as the text/halftone component in the determination component setting section 5305 belong to a text or a halftone. A threshold set in the text/halftone determination threshold setting section 5311 is used for the determination. The text pixel counting section 5312 counts pixels determined to belong to the text, while the halftone pixel counting section 5313 counts pixels determined to belong to the halftone. In particular, the chromatic/achromatic pixel determining section 5340 provides notification of the determination result whether a target pixel is chromatic or achromatic to each of the counting sections 5312 and 5313. This allows the counting of pixels which belong to the text and are chromatic (i.e., belong to the color text) and the counting of pixels which belong to the halftone and are chromatic (i.e., belong to the color halftone).

The page background/photographic-picture determining section 5320 determines whether pixels in a component classified as the page background/photographic-picture component in the determination component setting section 5305 are the pixels belonging to the page background or the photographic-picture. A threshold set in the page background/photographic-picture determination threshold setting section 5321 is used for the determination. The page background pixel counting section 5322 counts pixels determined to belong to the page background, and the photographic-picture pixel counting section 5323 counts pixels determined to belong to the photographic-picture. In particular, the chromatic/achromatic determining section 5340 provides notification of the determination result whether the target pixel is chromatic or achromatic to each of the counting sections 5322 and 5323. This allows the counting of pixels which belong to the page background and are chromatic (i.e., belong to the color page background) and the counting of pixels which belong to the halftone and are chromatic (i.e., belong to the color photographic-picture).

The document determining section 5330 performs the determination of the document type based on the counting result of the pixels in each of the components and determines whether color copying or monochrome copying is to be performed for the document. A method for the determination will be described later in detail.

Figure 6:
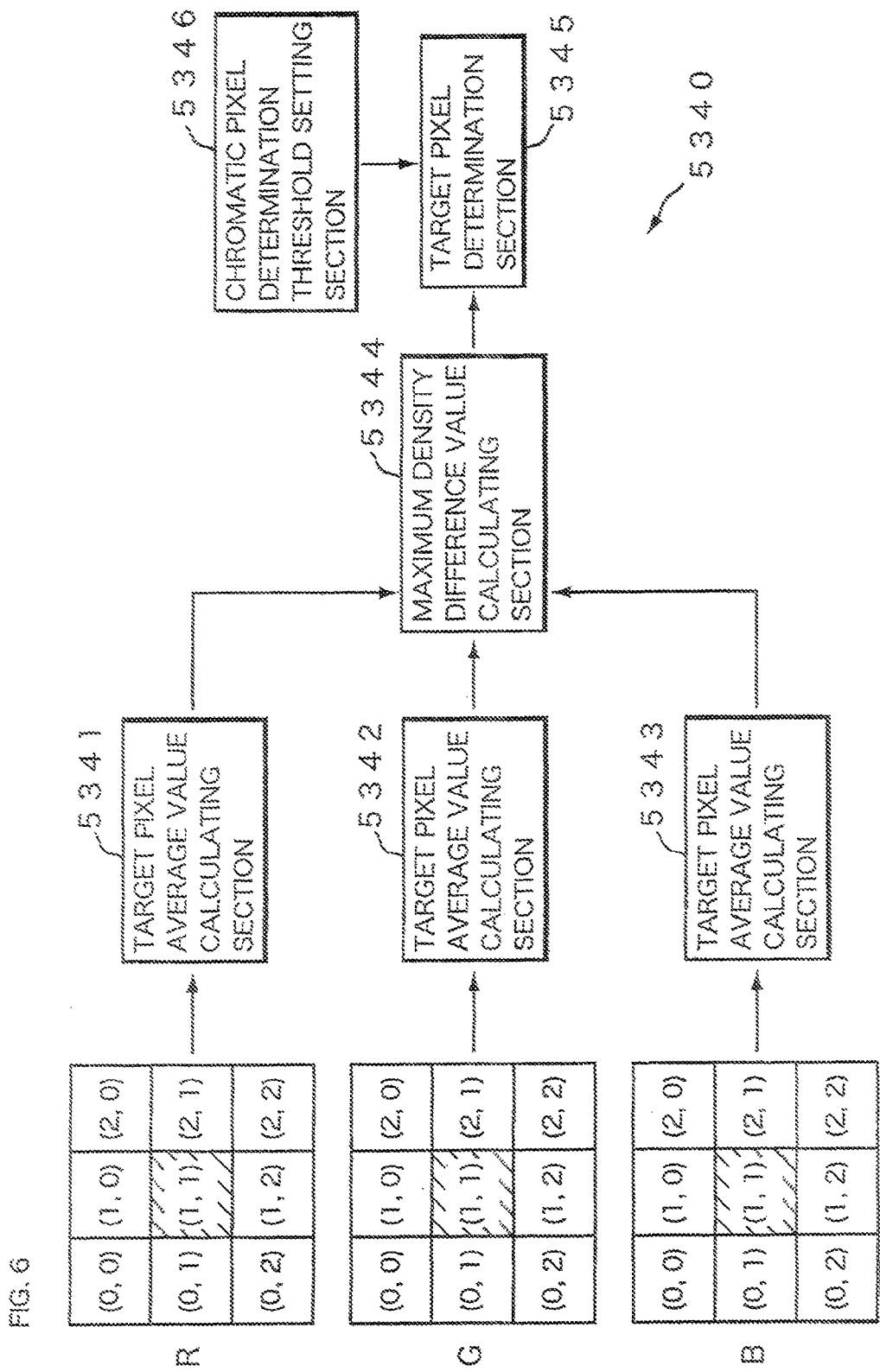
FIG. 6 is a block diagram illustrating an internal structure of a chromatic/achromatic pixel determination section.

FIG. 6 is a block diagram illustrating an internal structure of the chromatic/achromatic pixel determining section 5340. The chromatic/achromatic pixel determining section 5340 determines whether individual pixels in the RGB signals inputted thereto are chromatic or achromatic, and comprises target pixel average value calculating sections 5341 to 5343, a maximum density difference value calculating section 5344, a target pixel determining section 5345, and a chromatic pixel determination threshold setting section 5346.

First, each of the target pixel average value calculating sections 5341 to 5343 calculates an average value in an n×m block (e.g., 3×3) with the target pixel (hatched pixels in FIG. 6) in the center for each of the input signals.

Next, in the maximum density difference value calculating section 5344, maximum and minimum values of each of the calculated signals are calculated, and the difference value between the maximum and minimum values of each of the signals is calculated as the maximum density difference value at each of the target pixels. Subsequently, the target pixel determining section 5345 compares the calculated maximum density difference value and a chromatic pixel determination threshold (e.g., 20) predetermined in the chromatic pixel determination threshold setting section 5346. As a result, when the maximum density difference value is larger than the chromatic pixel determination threshold, the target pixel is determined to be a chromatic pixel. On the other hand, when the maximum density difference value is smaller than the chromatic pixel determination threshold, the target pixel is determined to be an achromatic pixel. The determination result is inputted to each of the text pixel counting section 5312, the halftone pixel counting section 5313, the page background pixel counting section 5322, and the photographic-picture pixel counting section 5323, and is used when pixels belonging to the chromatic text component, pixels belonging to the halftone component, pixels belonging to the page background component, and pixels belonging to the photographic-picture component are individually counted.

Figure 7:
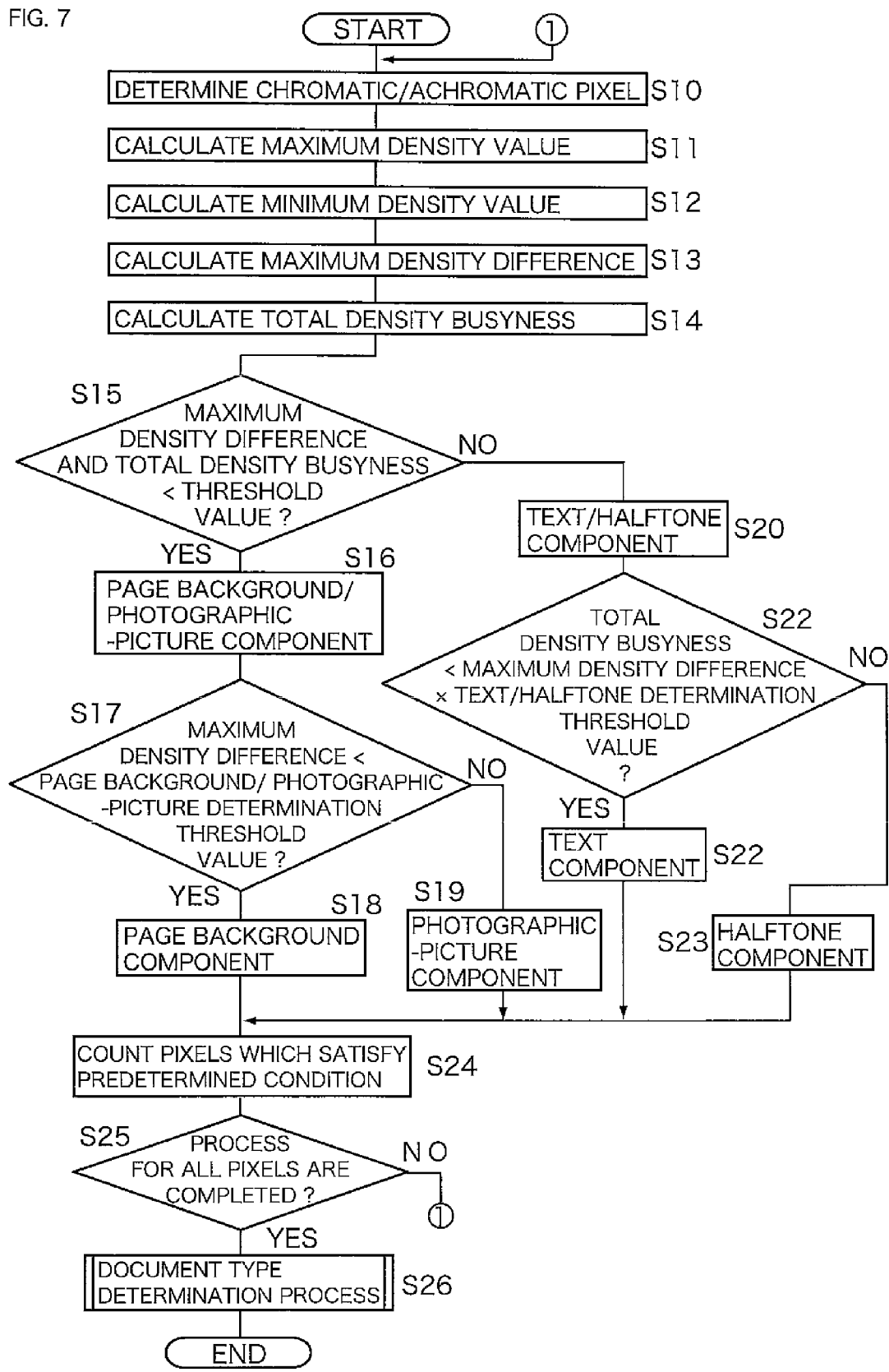
FIG. 7 is a flow chart illustrating the procedure of a process performed by the document type determination section.

A description will be given hereinbelow to the procedure of a process of the document type determination performed by the document type determination section 53. FIG. 7 is a flow chart illustrating the procedure of the process executed by the document type determination section 53. A description will be given hereinbelow to the case where the determination of an n×m block (e.g., 7×7) is performed. First, the document type determination section 53 performs the chromatic/achromatic determination of the target pixel in the n×m block by the method described above (Step S10).

Next, the document type determination section 53 calculates minimum and maximum density values in the n×m block containing the target pixel (Steps S11 and S12), and calculates the maximum density difference using the calculated minimum and maximum density values (Step S13). Then the document type determination section 53 calculates the sum of absolute values of density differences between adjacent pixels (i.e., the total density busyness) (Step S14).

Subsequently, a comparison between the calculated maximum density difference and the maximum density difference threshold, and a comparison between the calculated total density busyness and the total density busyness threshold are performed to determine whether or not both the maximum density difference and the total density busyness are smaller than respective thresholds for comparison (Step S15). When it is determined that the maximum density difference is smaller than the maximum density difference threshold, and the total density busyness is smaller than the total density busyness threshold (S15: YES), the target pixel is determined to belong to the page background/photographic-picture component (Step S16).

At this time, a comparison between the maximum density difference and a threshold (a page background/photographic-picture determination threshold) set by the page background/photographic-picture determination threshold setting section 5321 is performed to determine whether or not the maximum density difference is smaller than the page background/photographic-picture determination threshold (Step S17). When it is determined that the maximum density difference is smaller than the page background/photographic-picture determination threshold (S17: YES), the target pixel is counted as a pixel belonging to the background component (Step S18). When it is determined that the maximum density difference is not less than the page background/photographic-picture determination threshold (Step S17: NO), the target pixel is counted as a pixel belonging to the photographic-picture component (Step S19).

On the other hand, when it is determined that either one of the maximum density difference and the total density busyness is not less than the corresponding threshold for comparison (S15: NO), the target pixel is determined to belong to the text/halftone component (Step S20).

At this time, the total density busyness is compared with the product of the maximum density difference and a threshold (a text/halftone determination threshold) set by the text/halftone determination threshold setting section 5311 to determine whether or not the total density busyness is smaller than the product value (Step S21). When it is determined that the total density busyness is smaller than the product value (S21: YES), the target pixel is counted as a pixel belonging to the text component (Step S22). When it is determined that the total density busyness is not less than the product value (S21: NO), the target pixel is counted as a pixel belonging to the halftone component (Step S23).

It is to be noted that the chromatic/achromatic pixel determination process in Step S10 be executed either concurrently with or after the processes in Steps S11 to S23.

Next, the document type determination section 53 counts pixels which satisfy a predetermined condition (Step S24). In the present embodiment, pixels belonging to the color text component, pixels belonging to the color halftone component, and pixels belonging to the color page background component are individually counted in Step S24.

Then, it is determined whether or not all processes for pixels are completed (Step S25). When it is determined that all processes are not completed (S25: NO), the process flow returns to S10. When it is determined that all processes for pixels are completed (S25: YES), a document type determination process, which will be described later, is performed (Step S26).

Figure 8:
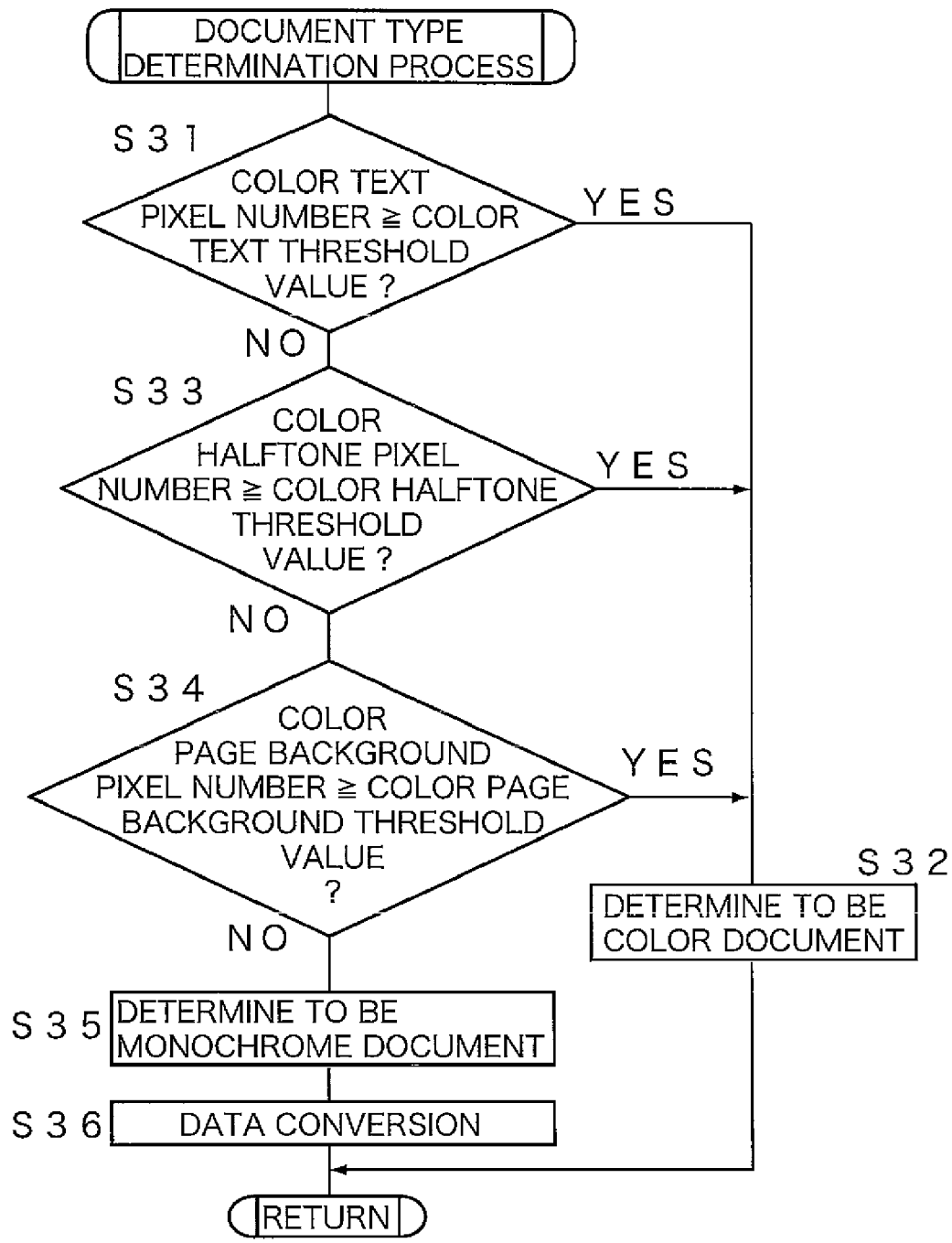
FIG. 8 is a flow chart showing the procedure of a document type determination process.

FIG. 8 is a flow chart showing the procedure of the document type determination process. In the present embodiment, individual count values (or ratios to the total number of pixels in an entire document) of the color text, the color halftone, and the color page background are compared with respective predetermined thresholds (hereinafter referred to as a color text threshold, a color halftone threshold, and a color page background threshold) to determine whether the document is a color document or a monochrome document (black-and-white document). First, the document type determination section 53 determines whether or not the number of pixels belonging to the color text (a color text pixel number) counted in the text pixel counting section 5312 is not less than the color text threshold (Step S31). In the case where the color text threshold is assigned as a ratio to the total number of pixels in the entire document, a ratio of, e.g., 0.15% can be used. When it is determined that the color text pixel number is not less than the color text threshold (S31: YES), the document is determined to be the color document (Step S32).

When it is determined that the color text pixel number is smaller than the color text threshold (S31: NO), the document type determination section 53 determines whether or not the number of pixels belonging to the color halftone (a color halftone pixel number) counted in the halftone pixel counting section 5313 is not less than the color halftone threshold (Step S33). In the case where the color halftone threshold is assigned as a ratio to the total number of pixels in the entire document, a ratio of, e.g., 1% can be used. When it is determined that the color halftone pixel number is not less than the color halftone threshold (S33: YES), the document is determined to be the color document (S32).

When it is determined that the color halftone pixel number is smaller than the color halftone threshold (S33: NO), the document type determination section 53 determines whether or not the number of pixels belonging to the color page background (a color page background pixel number) counted in the page background pixel counting section 5322 is not less than the color page background threshold (Step S34). In the case where the color halftone threshold is assigned as a ratio to the total number of pixels in the entire document, a ratio of, e.g., 20% can be used. When it is determined that the color halftone pixel number is not less than the color halftone threshold (S34: YES), the document is determined to be the color document (S32).

When it is determined that the color page background pixel number is smaller than the color page background threshold (S34: NO), the document is determined to be the monochrome document (Step S35). When the document is determined to be the monochrome document, data conversion is performed (Step S36). The data conversion is a process for replacing pixels determined to be chromatic pixels with achromatic pixels (black-and-white pixels).

In the flow chart shown in FIG. 8, the color document/monochrome document determination is performed by comparing the count values with their respective thresholds. However, the document type may be determined to be the color document when ratios of the foregoing three count values are represented in numerical expression and the following condition is satisfied.

(color text pixel number/color text threshold)+(color halftone pixel number/color halftone threshold)+ (color page background pixel number/color page background threshold)>1

In this case, it is possible to determine even a document having a small number of chromatic pixels present in a plurality of components to be the color document. In the above description, the comparison between the color text pixel number and the color text threshold, the comparison between the color halftone pixel number and the color halftone threshold, and the comparison between the color page background pixel number and the color page background threshold are successively performed in this order. However, these comparisons may also be concurrently performed and, when any of the color text pixel number, the color halftone pixel number, and the color page background pixel number is not less than the corresponding predetermined threshold, the document may be determined to be the color document.

The chromatic/achromatic pixel determination (S10) and the document type determination (S26) are performed using, e.g., pre-scanned image data. In the document type determination, in addition to the color document/monochrome document determination described above, the determination of a text document, a text and printed picture document, a printed picture document, a photographic-picture document, and a text and photographic-picture document may be performed. For example, by setting thresholds for the page background component, the photographic-picture component, the halftone component, and the text component, and comparing determined numbers of pixels with the thresholds, the determination of the document type can be performed.

For example, when both of the ratio of the text component and the ratio of the halftone component are not less than respective thresholds, the document is determined to be a text/halftone document (text and printed picture document). When it is assumed that the text, the halftone, and the photographic-picture are progressively higher in detection accuracy in this order, when the ratio of the text component to the total number of pixels is 30%, the document is determined to be the text document. When the ratio of the halftone component to the total number of pixels is 20%, the document is determined to be the halftone document (printed picture document). When the ratio of the photographic-picture component to the total number of pixels is 10%, the document is determined to be the photographic-picture document. For the document type, the document is determined herein to be the text document, the text and printed picture document, the printed picture document, the photographic-picture document, or the text and photographic-picture document.

In the present embodiment, when the maximum density difference value in the n×m block with the target pixel in the center is larger than the threshold (chromatic pixel determination threshold) in the chromatic/achromatic determination, the target pixel is determined to be the chromatic pixel. On the other hand, when the maximum density difference value is smaller than the threshold, the target pixel is determined to be the achromatic pixel. However, it is also possible to use a known method such as (1) a determination method which compares a difference between maximum and minimum values of RGB signals with a predetermined threshold, (2) a method which obtains an absolute value of differences between color components of RGB signals and compares the obtained absolute value with a threshold, or the like.

In addition, although the determination of the component is performed by using the maximum density difference and the total density busyness in the n×m block with the target pixel in the center in the present embodiment, the method for the determination of the component for each pixel is not limited to the method described above, and a method described hereinbelow may also be used. The following determinations are performed in a block of M×N pixels (e.g., 7×7 pixels) with the target pixel in the center to provide a segmentation class signal for the target pixel.

An average value $D_{ave}$ of signal levels of pixels in the block is obtained and each of the pixels in the block is binarized using the average value. At the same time, a maximum pixel signal level $D_{max}$ and a minimum pixel signal level $D_{min}$ are also obtained.

In the text component, it is considered that the difference between the maximum and minimum pixel signal levels $D_{max}$ and $D_{min}$ is large, and the density is also high. Therefore, when $D_{sub}>PC$ or $D_{min}<PB$ is satisfied, the subject of the determination is determined to be the text component.

The halftone component has a characteristic feature that an image signal fluctuation in a small area is large and the density is high compared with the background. The halftone component is identified by using the characteristic feature. For binarized data, the number of change points from 0 to 1 and the number of change points from 1 to 0, which are provided with reference marks KH and KV, are obtained in sub-scanning and main-scanning directions. When both of KH and KV are larger than thresholds TH and TV as a result of the comparison therebetween, the subject of the determination is determined to be the halftone component. To prevent an erroneous determination with regard to the background, $D_{max}$, $D_{min}$, and $D_{ave}$, which have already been obtained, are compared with thresholds B1 and B2 and, when $D_{max}-D_{ave}>B1$, $D_{ave}-D_{min}>B2$, KH>TH, and KV>TV are all satisfied, the subject of the determination is determined to be the halftone component.

Classification of the target pixel is performed by using the two determination results described above. That is, when the component is determined to be the halftone component in the halftone determination, the target pixel is determined to belong to the halftone component irrespective of the determination result of the text determination. When the component is not determined to be the halftone component in the halftone determination and the component is determined to be the text component in the text component, the target pixel is determined to belong to the text component. When the component is not determined to be the halftone component in the halftone determination or the text component in the text determination, the target pixel is determined to belong to the photographic-picture component or the page background component.

Further, in the above description, the component with the page background only may be classified by obtaining the maximum density difference and the total density busyness and comparing them with respective thresholds. In other words, since the determinations of the text and the halftone are performed by the method described above, thresholds for determining only the page background may be assigned. That is, when the maximum density difference<the page background/photographic-picture determination threshold and the total density busyness<the total density busyness threshold are satisfied, the pixel is determined to be the page background pixel. When the component is not determined to be any of the text, the halftone, and the page background, the target pixel is determined to belong to the photographic-picture component.

It will easily be appreciated that, since the image processing apparatus described in the present embodiment comprises means (image output section 7) for performing the formation of an image on a sheet such as paper, an OHP film, or the like based on the image signals outputted by the image processing section 5, the image processing apparatus can be applied to an image forming apparatus such as a color copier, a digital multi-function peripheral, a printer, or the like.

Embodiment 2

In the first embodiment, the color document/monochrome document determination is performed by comparing the color text pixel number, the color halftone pixel number, and the color page background pixel number with respective predetermined thresholds. However, in the case where the function of identifying page background pixels is not provided, the color document/monochrome document determination may also be performed by using only the color text pixel number and the color halftone pixel number. In this case, pixels belonging to the color text component and pixels belonging to the halftone component are counted in Step S24 of the flow chart shown in FIG. 7.

Figure 9:
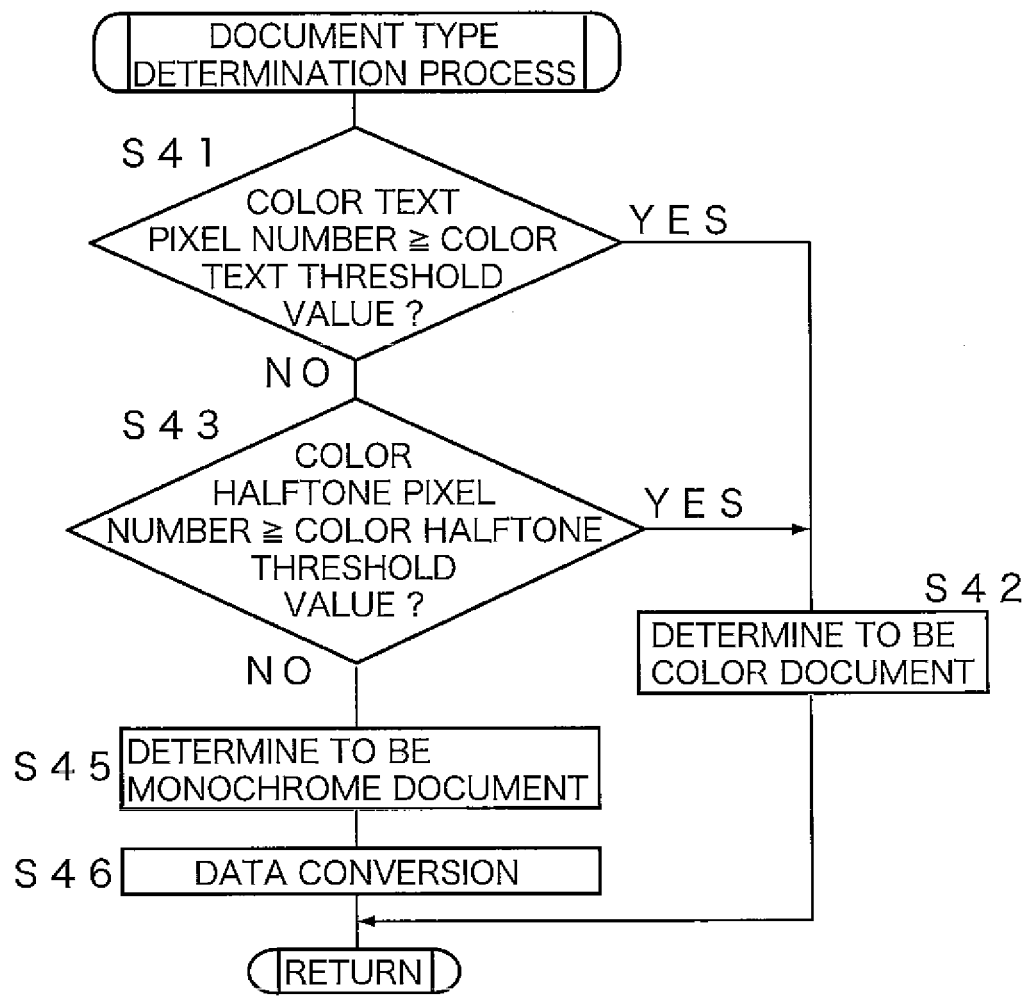
FIG. 9 is a flow chart showing the procedure of the document type determination process according to a second embodiment of the present application.

FIG. 9 is a flow chart showing the procedure of the document type determination process according to a second embodiment. First, the document type determination section 53 determines whether or not the color text pixel number is not less than the color text threshold (Step S41). When it is determined that the color text pixel number is not less than the color text threshold (S41: YES), the document is determined to be the color document (Step S42).

When it is determined that the color text pixel number is smaller than the color text threshold (S41: NO), the document type determination section 53 determines whether or not the color halftone pixel number is not less than the color halftone threshold (Step S43). When it is determined that the color halftone pixel number is not less than the color halftone threshold (S43: YES), the document is determined to be the color document (S42).

When it is determined that the color halftone pixel number is smaller than the color halftone threshold (S43: NO), the document is determined to be the monochrome document (Step S45). When the document is determined to be the monochrome document, the data conversion is performed (Step S46). The data conversion is a process for replacing pixels determined to be chromatic pixels with achromatic pixels (black-and-white pixel).

In the above description, the comparison between the color halftone pixel number and the color halftone threshold is performed after the comparison between the color text pixel number and the color text threshold. However, these comparisons may be performed concurrently and, when either of the color text pixel number and the color halftone pixel number is not less than the corresponding threshold, the document may be determined to be the color document.

Embodiment 3

In the first embodiment, the color document/monochrome document determination is performed by comparing the color text pixel number, the color halftone pixel number, and the color page background pixel number with respective predetermined thresholds. However, such a structure may be adopted that, instead of the color page background pixel number, the number of pixels belonging to the color photographic-picture component (a color photographic-picture pixel number) is compared with a threshold (a color photographic-picture threshold) predetermined for the color photographic-picture pixel number. In this case, pixels belonging to the color text component, pixels belonging to the color halftone component, and pixels belonging to the color photographic-picture component are counted in Step S24 of the flow chart shown in FIG. 7.

Figure 10:
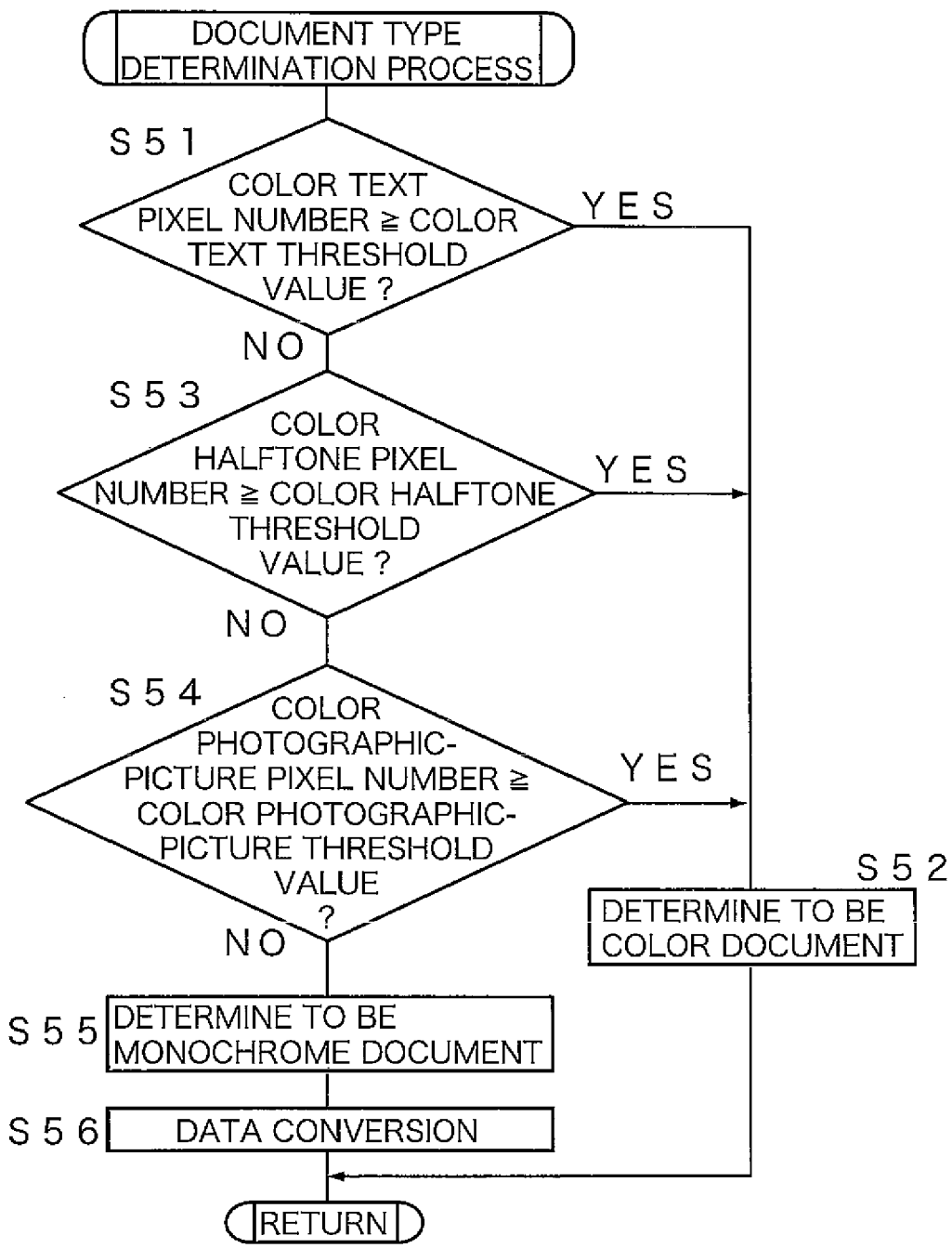
FIG. 10 is a flow chart showing the procedure of the document type determination process according to a third embodiment of the present application.

FIG. 10 is a flow chart showing the procedure of the document type determination process according to a third embodiment. First, the document type determination section 53 determines whether or not the color text pixel number is not less than the color text threshold (Step S51). When it is determined that the color text pixel number is not less than the color text threshold (S51: YES), the document is determined to be the color document (Step S52).

When it is determined that the color text pixel number is smaller than the color text threshold (S51: NO), the document type determination section 53 determines whether or not the color halftone pixel number is not less than the color halftone threshold (Step 53). When it is determined that the color halftone pixel number is not less than the color halftone threshold (S53: YES), the document is determined to be the color document (S52).

When it is determined that the color halftone pixel number is smaller than the color halftone threshold (S53: NO), the document type determination section 53 determines whether or not the color photographic-picture pixel number is not less than the color photographic-picture threshold (Step S54). When it is determined that the color photographic-picture pixel number is not less than the color photographic-picture threshold (S54: YES), the document is determined to be the color document (S52).

When it is determined that the color photographic-picture pixel number is smaller than the color photographic-picture threshold (S54: NO), the document is determined to be the monochrome document (Step S55). When the document is determined to be the monochrome document, the data conversion is performed (Step S56). The data conversion is a process for replacing pixels determined to be chromatic pixels with achromatic pixels (black-and-white pixels).

In the above description, the comparison between the color text pixel number and the color text threshold, the comparison between the color halftone pixel number and the color halftone threshold, and the comparison between the color photographic-picture pixel number and the color photographic-picture threshold are successively performed in this order. However, these comparisons may also be concurrently performed and, when any of the color text pixel number, the color halftone pixel number, and the color photographic-picture pixel number is not less than the corresponding predetermined threshold, the document may be determined to be the color document.

Embodiment 4

In the first embodiment, the color document/monochrome document determination is performed by comparing the color text pixel number, the color halftone pixel number, and the color page background pixel number with respective predetermined thresholds. However, in addition to them, consideration may be given to the result of the comparison between the color photographic-picture pixel number and the color photographic-picture threshold. In this case, pixels belonging to the color text component, pixels belonging to the color halftone component, pixels belonging to the color page background component, and pixels belonging to the color photographic-picture component are counted in Step S24 of the flow chart shown in FIG. 7.

Figure 11:
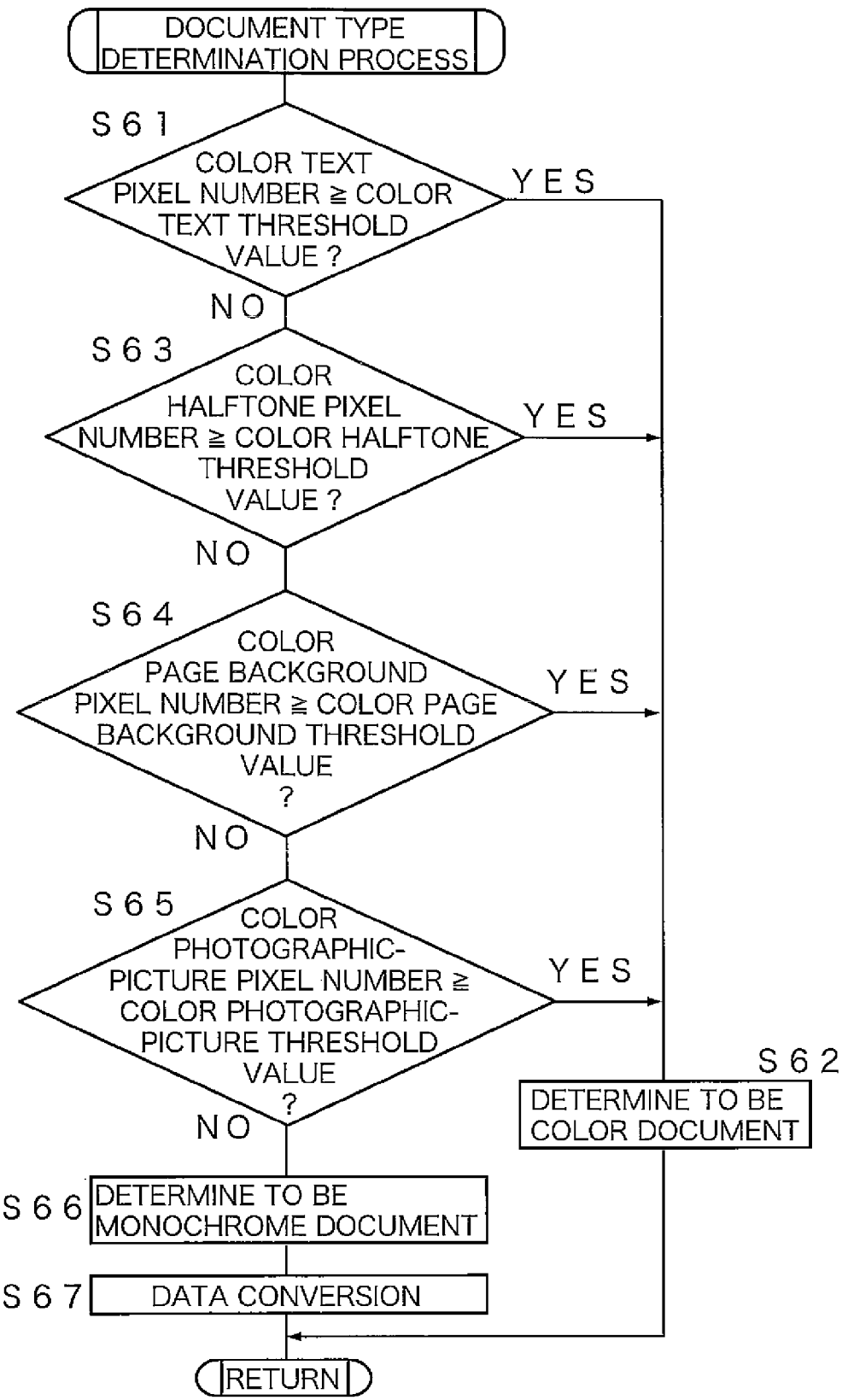
FIG. 11 is a flow chart showing the procedure of the document type determination process according to a fourth embodiment of the present application.

FIG. 11 is a flow chart showing the procedure of the document type determination process according to a forth embodiment. First, the document type determination section 53 determines whether or not the color text pixel number is not less than the color text threshold (Step S61). When it is determined that the color text pixel number is not less than the color text threshold (S61: YES), the document is determined to be the color document (Step S62).

When it is determined that the color text pixel number is smaller than the color text threshold (S61: NO), the document type determination section 53 determines whether or not the color halftone pixel number is not less than the color halftone threshold (Step S63). When it is determined that the color halftone pixel number is not less than the color halftone threshold (S63: YES), the document is determined to be the color document (S62).

When it is determined that the color halftone pixel number is smaller than the color halftone threshold (S63: NO), the document type determination section 53 determines whether or not the color page background pixel number is not less than the color page background threshold (Step S64). When it is determined that the color page background pixel number is not less than the color page background threshold (S64: YES), the document is determined to be the color document.

When it is determined that the color page background pixel number is smaller than the color page background threshold (S64: NO), the document type determination section 53 determines whether or not the color photographic-picture pixel number is not less than the color photographic-picture threshold (Step S65). When it is determined that the color photographic-picture pixel number is not less than the color photographic-picture threshold (S65: YES), the document is determined to be the color document (S62).

When it is determined that the color photographic-picture pixel number is smaller than the color photographic-picture threshold (S65: NO), the document is determined to be the monochrome document (Step S66). When the document is determined to be the monochrome document, the data conversion is performed (Step S67). The data conversion is a process for replacing pixels determined to be chromatic pixels with achromatic pixels (black-and-white pixels).

In the above description, the comparison between the color text pixel number and the color text threshold, the comparison between the color halftone pixel number and the color halftone threshold, the comparison between the color page background pixel number and the color page background threshold, and the comparison between the color photographic-picture pixel number and the color photographic-picture threshold are successively performed in this order. However, these comparisons may also be concurrently performed and, when any of the color text pixel number, the color halftone pixel number, the color page background pixel number, and the color photographic-picture pixel number is not less than the corresponding predetermined threshold, the document may be determined to be the color document.

Embodiment 5

In the forth embodiment, the color document/monochrome document determination is performed by comparing the color text pixel number, the color halftone pixel number, the color page background pixel number, and the color photographic-picture pixel number with respective predetermined thresholds. However, it is also possible to collectively count all of the color halftone pixel number, the color page background pixel number, and the color photographic-picture pixel number. In other words, in the present embodiment, pixels are divided into pixels belonging to the color text and chromatic pixels belonging to components other than the color text component, and are individually counted in Step S24 of the flow chart shown in FIG. 7.

Figure 12:
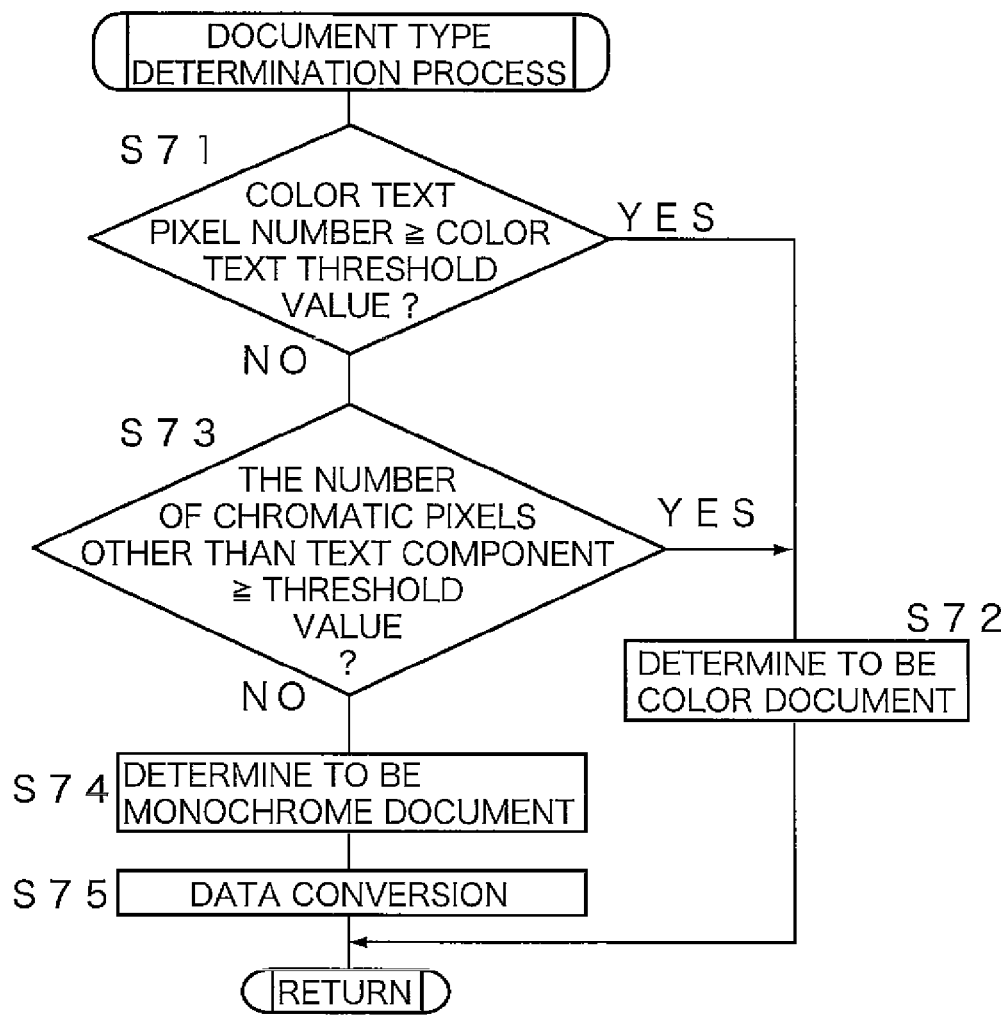
FIG. 12 is a flow chart showing the procedure of the document type determination process according to a fifth embodiment of the present application.

FIG. 12 is a flow chart showing the procedure of the document type determination process according to a fifth embodiment. First, the document type determination section 53 determines whether or not the color text pixel number is not less than the color text threshold (Step S71). When it is determined that the color text pixel number is not less than the color text threshold (S71: YES), the document is determined to be the color document (Step S72).

When it is determined that the color text pixel number is smaller than the color text threshold (S71: NO), it is determined whether or not the number of chromatic pixels belonging to the components other than the text component is not less than a predetermined threshold (Step S73). When it is determined that the number of chromatic pixels belonging to the components other than the text component is not less than the predetermined threshold (S73: YES), the document is determined to be the color document (S72).

When it is determined that the number of chromatic pixels belonging to the components other than the text component is smaller than the predetermined threshold (S73: NO), the document is determined to be the monochrome document (Step S74). When the document is determined to be the monochrome document, the data conversion is performed (Step S75). The data conversion is a process for replacing pixels determined to be chromatic pixels with achromatic pixels (black-and-white pixels).

In the above description, the comparison between the number of chromatic pixels belonging to the components other than the text component and the predetermined threshold is performed after the comparison between the color text pixel number and the color text threshold. However, these comparisons may be concurrently performed and, when either of the color text pixel number and the number of chromatic pixels belonging to the components other than the text component is not less than the corresponding predetermined threshold, the document may be determined to be the color document.

Embodiment 6

Although the first embodiment describes the case where the present application is applied to an image forming apparatus such as a color copier, digital multi-function peripheral, printer, or the like, the application of the present application is not limited thereto. It may be applied to an image processing apparatus such as, e.g., a facsimile communication apparatus, an image reading apparatus, or the like.

Figure 13:
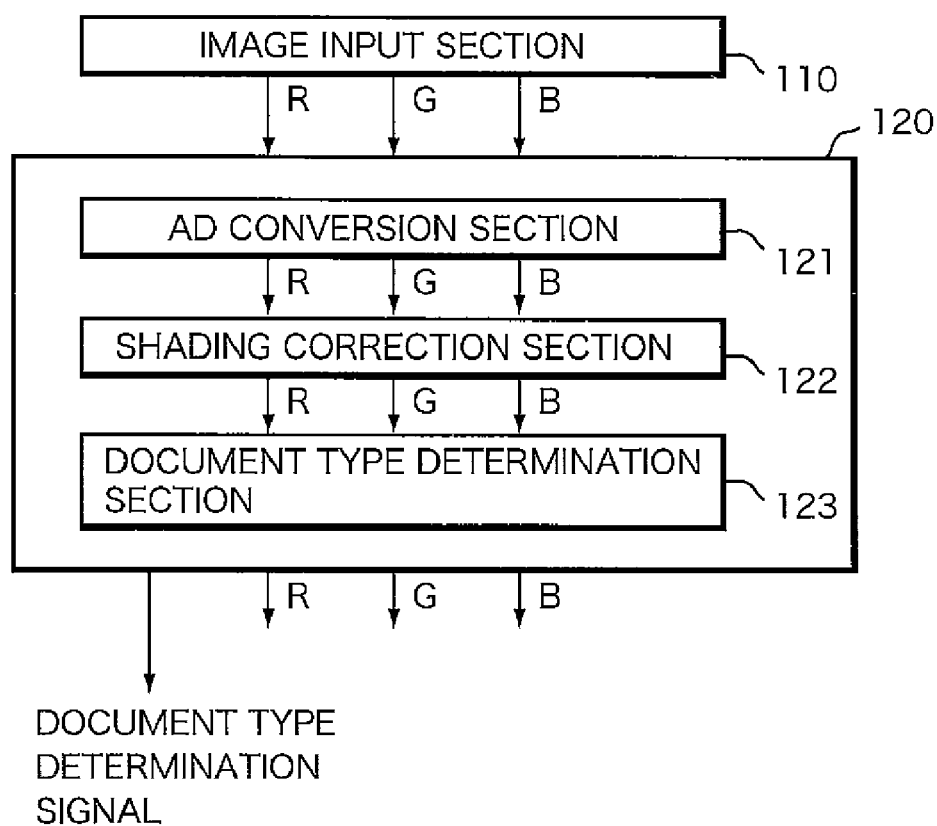
FIG. 13 is a block diagram showing an example of a structure of an image processing section when the present application is applied to a flat head scanner (image reading apparatus)

FIG. 13 is a block diagram showing an example of a structure of an image processing section when the present application is applied to a flat head scanner (image reading apparatus). As shown in the drawing, the image processing section 120 of the flat head scanner comprises an AD conversion section 121, a shading correction section 122, and a document type determination section 123. The image processing section 120 converts analog electric signals outputted from an image input section 110 to digital electric signals, and then performs the determination of document types to generate image signals to be outputted. Since respective functions of the AD conversion section 121, the shading correction section 122, and the document type determination section 123 in a color image input apparatus (image reading apparatus) are approximately the same as those of the AD conversion section 51, the shading correction section 52, and the document type determination section 53 in the image processing section 5 described above, the description thereof will be omitted. The image data subjected to the processes mentioned above is inputted to a computer, a printer, or the like. The processes described above are controlled by a CPU which is not shown.

Embodiment 7

Although each of the processes is implemented by hardware devices in the first embodiment, the image processing of the present application may be implemented by software processing.

Figure 14:
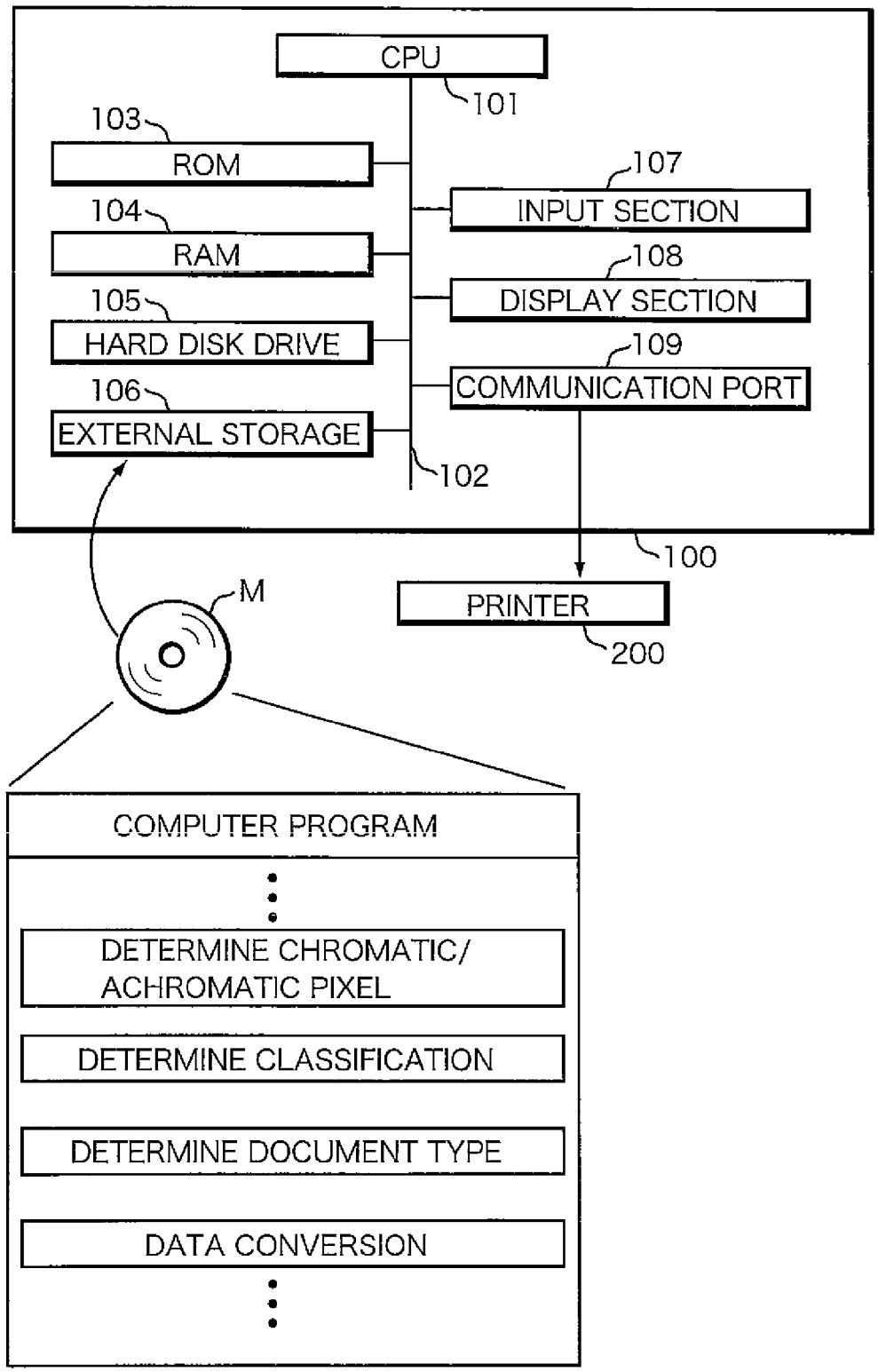
FIG. 14 is a block diagram illustrating an internal structure of an image processing apparatus in which a computer program of the present application is installed.

FIG. 14 is a block diagram illustrating an internal structure of an image processing apparatus in which a computer program of the present application is installed. In the drawing, reference numeral 100 denotes an image processing apparatus according to the present embodiment, and specifically denotes a personal computer, a workstation, and the like. The image processing apparatus 100 comprises a CPU 101. To the CPU 101, hardware devices including a ROM 103, a RAM 104, a hard disk 105, an external storage 106, an input section 107, a display section 108, a communication port 109 and the like are connected via a bus 102. The CPU 101 controls the individual hardware sections mentioned above in accordance with a control program stored therein in advance.

The RAM 104 is a volatile memory for temporarily storing various data generated during the execution of the control program mentioned above or the computer program according to the present application. The hard disk 105 is a storage means having a magnetic recording medium in which the computer program of the present application, image data to be processed, or the like are stored. The external storage 106 comprises a reading apparatus for reading program code from a recording medium M in which the program code (executable program, intermediate code program, and source program) of the computer program of the present application is stored. As the recording medium M, a FD (Flexible Disk), a CD-ROM, or the like can be used. The program code read by the external storage 106 is stored in the hard disk 105. The CPU 101 implements the image processing method according to the present application as described in the first and second embodiments by loading the program code stored in the hard disk 105 into the RAM 104 and executing the loaded program code.

The input section 107 functions as an interface for obtaining image data from the outside. To the input section 107, for example, a color scanner apparatus or the like is connected. The display section 108 functions as an interface for displaying image data to be processed, during the image processing, and after the image processing. An external display apparatus such as a liquid crystal display device may be connected to the display section 108 to display image data, or the display section 108 itself may comprise a display apparatus to display image data. The communication port 109 is an interface for connecting a printer 200 to the outside. When the processed image data is printed in the printer 200, the image processing apparatus 100 generates print data which can be decoded in the printer 200 based on the image data described above, and transmits the generated print data to the printer 200.

Although the structure is adopted in which various arithmetic operations are executed by the CPU 101 in the present embodiment, the structure may also be adopted in which a chip dedicated to arithmetic operations in accordance with the image processing is additionally provided and caused to perform the arithmetic operations by the instruction from the CPU 101.

As the recording medium M for storing the program code mentioned above, besides the FD and the CD-ROM described above, an optical disk such as a MO, a MD, a DVD, or the like, a magnetic recording medium such as a hard disk or the like, a card-type recording medium such as an IC card, a memory card, an optical card, or the like, and a semiconductor memory such as a mask ROM, an EPROM (Erasable Programmable Read Only Memory), an EEPROM (Electrically Erasable Programmable Read Only Memory), a flash ROM, or the like can also be used. In addition, since the system configuration is connectable to communication network including the Internet, the program code described above may also be downloaded from the communication network. In the case where the program code is thus downloaded from the communication network, a program for the downloading may be either stored in the main body of the apparatus in advance or installed from another recording medium.

The present application can also be implemented in the form of computer data signals embedded in a carrier wave in which the above-mentioned program code is realized by an electronic transmission.

The computer program of the present application may be provided either in the form of an independent application program or utility program, or in the form of a part of the function of another application program or utility program in which the computer program is incorporated. For example, as an example of the form, there can be considered a case where the computer program is incorporated in a printer driver and provided. In this case, the ACS determination process is performed with respect to image data obtained by reading a document image, and then the image processing in accordance with the result of the determination is performed with respect to the image data before the image data is translated into printer language to be transmitted to a printer apparatus in which the image data is to be printed.

As this application may be embodied in several forms without departing from the spirit of essential characteristics thereof, the present embodiment is therefore illustrative and not restrictive, since the scope of the application is defined by the appended claims rather than by the description preceding them, and all changes that fall within metes and bounds of the claims, or equivalence of such metes and bounds thereof are therefore intended to be embraced by the claims.

What is claimed is:

1. An image processing method comprising the steps of:
    counting pixels belonging to chromatic text and chromatic pixels belonging to a component other than the chromatic text among pixels composing image data obtained by reading a document;
    comparing the counted number of the pixels belonging to the chromatic text and the counted number of the chromatic pixels belonging to the component other than the chromatic text with respective predetermined values;
    determining that the document contains a chromatic color when either one of the number of the pixels belonging to the chromatic text and the number of the chromatic pixels belonging to the component other than the chromatic text is not less than the corresponding predetermined value; and
    performing a process with respect to the image data in accordance with the determination result.

2. The image processing method according to claim 1, wherein the chromatic pixels belonging to the component other than the chromatic text include at least one of a pixel belonging to a chromatic halftone component, a pixel belonging to a chromatic page background component, and a pixel belonging to a chromatic photographic-picture component.

3. An image processing apparatus comprising:
    a counting section for counting pixels belonging to chromatic text and chromatic pixels belonging to a component other than the chromatic text among pixels composing image data obtained by reading a document;
    a comparison section for comparing the counted number of the pixels belonging to the chromatic text and the counted number of the chromatic pixels belonging to the component other than the chromatic text with respective predetermined values;
    a determination section for determining that the document contains a chromatic color when either one of the number of the pixels belonging to the chromatic text and the number of the chromatic pixels belonging to the component other than the chromatic text is not less than the corresponding predetermined value; and
    an image processing section for performing a process with respect to the image data in accordance with a determination result by the determination section.

4. The image processing apparatus according to claim 3, wherein the chromatic pixels belonging to the component other than the chromatic text include at least one of a pixel belonging to a chromatic halftone component, a pixel belonging to a chromatic page background component, and a pixel belonging to a chromatic photographic-picture component.

5. An image forming apparatus comprising:
    an image processing apparatus according to claim 3; and
    an image forming section for forming an image on a sheet based on image data subjected to a process performed by the image processing apparatus.

6. An image reading apparatus comprising:
    an image input section for reading a document; and
    an image processing apparatus according to claim 3, wherein
    the image processing apparatus performs image processing with respect to the document read by the image input section to provide output image data.

7. A non-transitory computer readable recording medium storing thereon a computer program executable to perform the steps of:
    causing a computer to count pixels belonging to chromatic text and chromatic pixels belonging to a component other than the chromatic text among pixels composing image data obtained by reading a document;
    causing the computer to compare the counted number of the pixels belonging to the chromatic text and the counted number of the chromatic pixels belonging to the component other than the chromatic text with respective predetermined values;
    causing the computer to determine that the document contains a chromatic color when either one of the number of the pixels belonging to the chromatic text and the number of the chromatic pixels belonging to the component other than the chromatic text is not less than the corresponding predetermined value; and
    causing the computer to perform a process with respect to the image data in accordance with the determination result.

8. An image processing method comprising the steps of:
    determining whether individual pixels composing image data obtained by reading a document are chromatic or achromatic;
    determining whether each pixel belongs to text or a component other than the text;
    counting chromatic pixels belonging to the text and chromatic pixels belonging to the component other than the text among pixels by the determined result;
    comparing the counted number of the chromatic pixels belonging to the text and the counted number of the chromatic pixels belonging to the component other than the text with respective predetermined values;
    determining that the document contains a chromatic color when either one of the number of the chromatic pixels belonging to the text and the number of the chromatic pixels belonging to the component other than the text is not less than the corresponding predetermined value; and performing a process with respect to the image data in accordance with the determination result.

9. An image processing apparatus comprising:

a determination section for determining whether individual pixels composing image data obtained by reading a document are chromatic or achromatic;

a determination section for determining whether each pixel belongs to text or a component other than text;

a counting section for counting chromatic pixels belonging to the text and chromatic pixels belonging to the component other than the text among pixels by the determined result;

a comparison section for comparing the counted number of the chromatic pixels belonging to the text and the counted number of the chromatic pixels belonging to the component other than the text with the respective predetermined values;

a determination section for determining that the document contains a chromatic color when either one of the number of the chromatic pixels belonging to the text and the number of the chromatic pixels belonging to the component other than the text is not less than the corresponding predetermined value; and an image processing section for performing a process with respect to the image data in accordance with a determination result by the determination section.

10. A non-transitory computer readable recording medium storing thereon a computer program executable to perform the steps of:

causing a computer to determine whether individual pixels composing image data obtained by reading a document are chromatic or achromatic;

causing a computer to determine whether each pixel belongs to text or a component other than the text;

causing a computer to count chromatic pixels belonging to the text and chromatic pixels belonging to the component other than the text among the pixels by the determined result;

causing a computer to compare the counted number of the chromatic pixels belonging to the text and the counted number of the chromatic pixels belonging to the component other than the text with respective predetermined values;

causing a computer to determine that the document contains a chromatic color when either one of the number of the chromatic pixels belonging to the text and the number of the chromatic pixels belonging to the component other than the text is not less than the corresponding predetermined value; and causing a computer to perform a process with respect to the image data in accordance with the determination result.

* * * * *